United States Patent [19]

Bosso

[11] 4,294,741

[45] Oct. 13, 1981

[54] CATIONIC POLYMERS AND THEIR USE IN ELECTRODEPOSITION

[75] Inventor: Joseph F. Bosso, Lower Burrell, Pa.

[73] Assignee: PPG Industries, Inc., Pittsburgh, Pa.

[21] Appl. No.: 162,224

[22] Filed: Jun. 23, 1980

[51] Int. Cl.³ ............................................. C08L 63/10
[52] U.S. Cl. ...................... 260/29.6 NR; 204/181 C; 260/29.7 RP
[58] Field of Search ................ 260/29.2 EP, 29.6 NR, 260/29.7 NR, 29.7 RP; 525/529, 530, 531, 532; 526/312; 204/181 C

[56] References Cited

U.S. PATENT DOCUMENTS

| | | | |
|---|---|---|---|
| 3,694,393 | 9/1972 | Lewis et al. | 260/29.6 |
| 3,912,608 | 10/1975 | Marans | 525/530 |
| 3,976,615 | 8/1976 | Sekmakas | 525/531 |
| 4,033,917 | 7/1977 | Sekmakas | 260/29.2 EP |
| 4,055,527 | 10/1977 | Jozwiak | 204/181 C |
| 4,064,087 | 12/1977 | Das | 260/29.6 RB |
| 4,085,161 | 4/1978 | Sekmakas | 260/29.6 HN |
| 4,151,143 | 4/1979 | Blank | 260/29.6 RW |
| 4,200,562 | 4/1980 | Yoshioka | 526/312 |
| 4,212,779 | 7/1980 | Schmolzer | 260/29.2 EP |
| 4,217,261 | 8/1980 | Sekmakas | 260/29.2 EP |

Primary Examiner—Paul R. Michl
Attorney, Agent, or Firm—William J. Uhl

[57] ABSTRACT

Polymeric products are prepared polymerizing in aqueous medium under addition polymerization conditions a dispersed phase of a polymerizable, ethylenically unsaturated monomer or mixture of polymerizable, ethylenically unsaturated monomers in the presence of a quaternary ammonium base group-containing polymer which is formed from reacting a polyepoxide with an unsaturated tertiary amine in the presence of a proton source. The polymeric products are useful in water-based coating compositions particularly for use in cationic electrodeposition.

32 Claims, No Drawings

CATIONIC POLYMERS AND THEIR USE IN ELECTRODEPOSITION

CROSS REFERENCE TO COPENDING APPLICATIONS

Reference is made to copending applications Ser. Nos. 162,223 and 162,225, filed even date herewith.

Application Ser. No. 162,223 describes polymeric products which are prepared by polymerizing in aqueous medium under addition polymerization conditions a dispersed phase of a polymerizable ethylenically unsaturated monomer or mixture of polymerizable ethylenically unsaturated monomers in the presence of a partially neutralized amine group-containing polymeric dispersant.

Application Ser. No. 162,225 describes polymeric products which are prepared by polymerizing in aqueous medium under addition polymerization conditions a dispersed phase of a polymerizable ethylenically unsaturated monomer or mixture of polymerizable, ethylenically unsaturated monomers in the presence of an at least partially neutralized adduct of a polyepoxide and a primary and/or a secondary amine and which contains pendent unsaturation.

BACKGROUND OF THE INVENTION

1. Field of the Invention

The present invention relates to polymeric products and to aqueous dispersions of polymeric products. More particularly, this invention relates to polymeric products containing cationic base groups and to their use in electrodeposition.

2. Brief Description of the Prior Art

Polymerization of diene and vinyl monomers in the presence of aqueous dispersions of anionic polymers is well known in the art. For example, U.S. Pat. No. 4,055,527 to Jozwiak and Das discloses polymerization of dienes and mixtures of dienes and vinyl monomers in aqueous dispersions in the presence of partially neutralized maleinized oils. U.S. Pat. No. 4,151,143 to Blank discloses a two-stage polymerization process for the preparation of anionic acrylic polymer emulsions. The first stage involves the preparation of an acrylic polymer with COOH groups. The polymer is neutralized with a base and dispersed in water. The second stage involves polymerizing a mixture of vinyl monomers with the previously prepared dispersion.

U.S. Pat. No. 4,064,087 to Das is similar to U.S. Pat. No. 4,151,143 mentioned above with the exception that the COOH-containing acrylic polymer also contains pendent double bonds.

SUMMARY OF THE INVENTION

In accordance with the present invention, stable aqueous dispersions of polymeric products are prepared by polymerizing in aqueous medium under free radical initiated addition polymerization conditions:

(A) an aqueous dispersed phase of a polymerizable, ethylenically unsaturated monomer composition, in the presence of (B) a quaternary ammonium base group-containing polymer which is formed from reacting a polyepoxide with an unsaturated amine in the presence of a proton source.

The invention also provides coating composition comprising the aqueous dispersions of the polymeric products, a method of preparing the polymeric products and a method of electrocoating an electrically conductive surface serving as a cathode in an electrical circuit comprising said cathode, an anode and an aqueous electrodepositable composition which comprises passing an electric current between said cathode and an anode and wherein the electrodepositable composition comprises the aforementioned polymeric product.

Other Patents

Besides the patents mentioned above, other patents of which applicant is aware are as follows:

U.S. Pat. No. 4,033,917 discloses the reaction of polyepoxides with fatty alcohols or fatty amines to form epoxy-free unsaturated products. These products are then further reacted with a copolymerizable ethylenically unsaturated monomer component, a portion of which contains amine functionality, for example, a mixture of styrene and dimethylaminopropyl methacrylate. The resultant reaction product is treated with acid and dispersed in water to form an aqueous cationic polymer dispersion.

U.S. Pat. No. 4,085,161 is similar to U.S. Pat. No. 4,033,917 mentioned above with the exception that an ethylenically unsaturated blocked isocyanate, for example, toluene diisocyanate capped with hydroxyethyl acrylate and a saturated alcohol, is included with the ethylenically unsaturated monomer component.

The present invention differs from these patents in that it uses quaternary ammonium base group-containing polymers which are not disclosed in the aforementioned patents. Also in the present invention, the ethylenically unsaturated monomer component is polymerized in aqueous dispersion in the presence of a cationic polymer. The aforementioned patents, on the other hand, disclose polymerization with the unneutralized polymer in organic solvent. After reaction, neutralization and dispersion in water takes place.

DETAILED DESCRIPTION

As mentioned above, the invention provides a polymeric product which is prepared in aqueous medium under addition polymerization conditions. The polymeric product is prepared by dispersing a polymerizable, ethylenically unsaturated monomer composition such as one which contains $CH_2=CH-$ moieties, for example, diene monomers, vinyl monomers and mixtures thereof in aqueous medium and in the presence of a quaternary ammonium base group-containing polymer which is formed from reacting a polyepoxide with an unsaturated tertiary amine in the presence of a proton source such as acid and/or water. The dispersion is subjected to addition polymerization conditions, for example, by heating in the presence of a free radical initiator.

The ethylenically unsaturated monomer composition can be selected from a variety of polymerizable ethylenically unsaturated materials particularly those having $CH_2=CH-$ moieties such as vinyl monomers, diene monomers and mixtures thereof. Examples of vinyl monomers which may be used are monoolefinic and diolefinic hydrocarbons such as $C_1-C_{18}$ alkyl acrylates and methacrylates. Examples include methyl methacrylate, butyl methacrylate, hexyl methacrylate, octyl methacrylate, isodecyl methacrylate, stearyl methacrylate, methyl acrylate, ethyl acrylate, butyl acrylate, hexyl acrylate, 2-ethylhexyl acrylate, octyl acrylate, decyl acrylate and dodecyl acrylate. Besides the alkyl esters of acrylic and methacrylic acid mentioned above, substituted alkyl esters, for example, hydroxyalkyl esters such as hydroxyethyl and hydroxypropyl acrylate and methacrylate can also be used.

Examples of other vinyl monomers are esters of organic acids such as vinyl acetate and isopropenyl acetate; allyl compounds such as allyl cyanide; amides of acrylic and methacrylic acid such as acrylamide and methacrylamide and their N-alkoxymethyl derivatives such as N-ethoxymethyl and N-butoxymethyl acrylamide and methacrylamide. Also, vinyl aromatic compounds such as styrene, alpha-methyl styrene, alpha-chlorostyrene and vinyl toluene may be used, as well as organic nitriles such as acrylonitrile and methacrylonitrile. Mixtures of vinyl monomers may be used.

Various dienes which may be used include 1,3-butadiene, isoprene and most of the di-unsaturated members of the alkylidene series including both the unsubstituted and substituted conjugated diolefins. The substituted diolefins may be those containing lower alkyl groups or halogen groups directly bonded to the alkylidene chain. Representative examples of these diolefins include chloroprene and 2,3-dimethylbutadiene. Also, mixtures of dienes as well as mixtures of dienes and vinyl monomers can be used.

The quaternary ammonium base group-containing polymers which are used in the practice of the invention are formed from reacting an organic polyepoxide with a tertiary amine. The polyepoxides which are used in the practice of the invention are polymers having a 1,2-epoxy equivalency greater than 1, preferably about 2 or more. Preferred are polyepoxides which are difunctional with regard to epoxy. The preferred polyepoxides are polyglycidyl ethers of cyclic polyols. Particularly preferred are polyglycidyl ethers of polyphenols such as bisphenol A. These polyepoxides can be produced by etherification of a polyphenol with epihalohydrin or dihalohydrin such as epichlorohydrin or dichlorohydrin in the presence of alkali. Examples of polyphenols other than bisphenol A are 1,1-bis-(4-hydroxyphenyl)ethane, 2-methyl-1,1-bis-(4-hydroxyphenyl)propane, 2,2-bis-(4-hydroxy-3-tertiarybutylphenyl)propane, bis-(2-hydroxynaphthyl)methane, 1,5-dihydroxynaphthalene or the like.

Besides polyphenols, other cyclic polyols can be used in preparing the polyglycidyl ethers of cyclic polyol derivatives. Examples of other cyclic polyols would be alicyclic polyols, particularly cycloaliphatic polyols, such as 1,2-cyclohexanediol, 1,4-cyclohexanediol, 1,2-bis(hydroxymethyl)cyclohexane, 1,3-bis(hydroxymethyl)cyclohexane and hydrogenated bisphenol A.

Also, oxyalkylated adducts such as ethylene and propylene oxide adducts of these alicyclic polyols and polyphenols mentioned above can be used as the cyclic polyol component.

Examples of other polyepoxides are polyglycidyl ethers of polyhydric alcohols, such as ethylene glycol, diethylene glycol, triethylene glycol, 1,2-propylene glycol, 1,3-propylene glycol, 1,4-butylene glycol, 1,5-pentanediol and the like.

Polyglycidyl esters of polycarboxylic acids which are produced by reaction of epichlorohydrin or a similar epoxy compound with an aliphatic or aromatic polycarboxylic acid can also be used. Examples of polycarboxylic acids are dicarboxylic acids such as adipic acid, succinic acid, glutaric acid, terephthalic acid, dimerized linoleic acid and the like.

The polyepoxides such as the preferred polyglycidyl ethers of cyclic polyols can be further reacted to chain extend and increase their molecular weight. For example, they may be further reacted with active hydrogen-containing materials which are reactive with the epoxy groups such as those containing primary hydroxy groups. Examples of chain extenders are organic polyols, preferably polymeric polyols such as polyester polyols including polylactone polyols. Chain extending of epoxy-containing polymeric materials with polymeric polyols is disclosed in U.S. Pat. No. 4,148,772 to Marchetti, Zwack and Jerabek and assigned to PPG Industries, Inc.

The polyepoxide can also be chain extended with N-heterocyclic-containing materials such as described in U.S. Pat. No. 4,144,159 to Bosso and Castellucci and assigned to PPG Industries, Inc.

The tertiary amine which is reacted with the polyepoxide is an unsaturated tertiary amine.

The tertiary amine is reacted with the polyepoxide in the presence of a proton source such as acid to form a quaternary ammonium salt group-containing polymer. This also means the tertiary amine can first be reacted with acid to form the amine salt and the salt reacted with the polyepoxide to form the quaternary ammonium salt group-containing polymer. Also, the tertiary amines can be reacted with the polyepoxides in the presence of water to form the quaternary ammonium hydroxide group-containing polymers. If desired, the quaternary ammonium hydroxide-containing polymer can be subsequently acidified to form quaternary ammonium salt groups. Acidification can be complete or partial such that the polymer contains a mixture of quaternary ammonium hydroxide and quaternary ammonium salt groups.

Suitable unsaturated tertiary amines are those which contain in addition to the tertiary amine group at least one ethylenically unsaturated copolymerizable group and containing up to about 22 carbon atoms and preferably from about 7 to 11 carbon atoms. Examples of compounds of this type are those having the following structural formula:

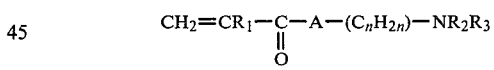

$$CH_2=CR_1-\underset{\underset{O}{\|}}{C}-A-(C_nH_{2n})-NR_2R_3$$

wherein $R_1$ is hydrogen or methyl, $R_2$ and $R_3$ are the same or different and are alkyl having 1 to 4 carbon atoms, preferably 1 to 2 carbon atoms, n is one of the integers 1 to 6, preferably 2 to 3 and A is oxygen or $NR_4$ where $R_4$ is hydrogen or alkyl having 1 to 4 carbon atoms, preferably A is oxygen.

Examples of suitable unsaturated tertiary amines are aminoalkyl esters of acrylic and methacrylic acid. Examples include N,N-dimethylaminoethyl acrylate, N,N-dimethylaminoethyl methacrylate, N-methyl-N-butylaminoethyl acrylate, and N,N-dimethylaminohexyl acrylate and N,N-dimethylaminohexyl methacrylate.

Examples of other suitable ethylenically unsaturated basic amino compounds are N-aminoalkyl acrylamides or methacrylamides. Specific examples of such compounds are N,N-dimethylaminoethyl acrylamide, N,N-dimethylaminoethyl methacrylamide, N,N-dimethylaminopropyl acrylamide, N,N-dimethylaminopropyl methacrylamide, N,N-dimethylaminohexyl acrylamide and N,N-dimethylaminohexyl methacrylamide.

Examples of other unsaturated tertiary amine compounds are monocyclic or bicyclic compounds having a 5-membered or 6-membered heterocyclic ring such as those containing a vinyl group and at least one tertiary amine group. The tertiary amine nitrogen can also bear the vinyl group. Suitable monocyclic and bicyclic compounds are those which contain no hetero atoms other than nitrogen and for the rest of the hydrocarbon radicals having not more than 20 carbon atoms. Specific examples are N-vinyl pyrazole, N-vinyl imidazole, N-vinyl imidazoline, N-vinyl piperidine and N-vinyl indole.

The reaction product of the unsaturated tertiary amine with the polyepoxide attains its cationic character by reaction in the presence of a proton source such as acid or water. Examples of suitable acids include organic and inorganic acids such as formic acid, acetic acid, lactic acid, boric acid and phosphoric acid. It is only necessary that sufficient acid be used to solubilize or disperse the product in water. Typically, the amount of acid used will be sufficient to provide at least 30 percent of the total theoretical neutralization. As mentioned above, in the reaction of the tertiary amine with the polyepoxide, the tertiary amine can be pre-reacted with the acid such as those mentioned above to form the amine salt and the salt reacted with the polyepoxide to form the quaternary ammonium salt group-containing resin. The reaction is conducted by mixing the amine salt and the polyepoxide together in the presence of a controlled amount of water. Typically, the water is employed on the basis of about 1.75 to about 20 percent by weight based on total reaction mixture solids.

Alternately, the tertiary amine can be reacted with the polyepoxide in the presence of water to form a quaternary ammonium hydroxide group-containing polymer which, if desired, may be subsequently acidified. The quaternary ammonium hydroxide-containing polymer can also be used without acid. The amount of water employed for the formation of the quaternary ammonium hydroxide should, of course, be sufficient for the formation of quaternary ammonium hydroxide groups. Preferably, based on amine groups, a stoichiometric equivalent or excess of water, that is, at least 1 mole of water per equivalent of amine, should be used. Excess water should not be used because it may result in extremely slow or even nonreaction. In forming the quaternary ammonium base group-containing polymer, the reaction temperature can be varied between the lowest temperature at which reaction reasonably proceeds, for example, room temperature, or in the usual case, slightly above room temperature, to a maximum temperature of 100° C. (at atmospheric pressure). At greater than atmospheric pressure, higher reaction temperatures can be used. Preferably, the reaction temperature ranges between about 60° to 100° C. Solvent for the reaction is usually not necessary, although an organic solvent such as a sterically hindered ester, ether or sterically hindered ketone may be used if desired.

In addition to the unsaturated tertiary amines disclosed above, a portion of the amine can be a saturated tertiary amine such as methyldiethylamine. Also, a portion of the amine which is reacted with the polyepoxide can be a ketimine or a polyamine. This is described in U.S. Pat. No. 4,104,147 in column 6, line 23, to column 7, line 23, the portions of which are hereby incorporated by reference. The ketimine groups will decompose upon dispersing the polyepoxyamine adduct in water resulting in free primary amine groups which would be reactive with a curing agent which are described in more detail below.

In general, most of the cationic polymers useful in the practice of the invention have average molecular weights (calculated values) within the range of 500 to 5000, preferably about 1000 to 3000, and contain from about 0.1 to 3.0, preferably from about 0.3 to 1.0 milliequivalents of cationic nitrogen per gram of resin solids. Obviously, one must use the skill in the art to couple the molecular weight of the cationic group content to arrive at a satisfactory polymer.

The amount of pendant unsaturation present in the polymer can vary over fairly wide ranges. The unsaturation equivalent or the weight per unsaturated moiety will vary between about 500 to 10,000 and usually 1000 to 6000 (calculated values).

The quaternary ammonium base group-containing polymer serves as a dispersant for the subsequent polymerization of the dispersed phase of the unsaturated polymerizable monomer composition.

The monomer composition is dispersed in the aqueous medium in the presence of the dispersant and subjected to addition polymerization conditions such as by heating in the presence of a free radical initiator. The time and temperature of polymerization will depend on one another, the ingredients selected and the scale of the reaction. Usually polymerization will be between about 2 to 20 hours at about 75° to 100° C.

For electrodeposition end use, the polymerization is preferably conducted in the presence of an oil-soluble free radical polymerization initiator and preferably in the presence of a chain transfer agent which is also oil soluble. Water soluble salt-forming free radical catalysts are preferably not used when the product is to be used in electrodeposition.

Examples of free oil-soluble free radical initiators are those which are soluble in the monomer component such as azobisisobutyronitrile, azobis(alpha, gamma-dimethylvaleronitrile), tertiary-butyl perbenzoate, tertiary-butyl peracetate, benzoyl peroxide and ditertiary butyl peroxide.

The amount of free radical initiator which is used should be about 1 to 4 percent by weight based on weight of polymerizable monomer component.

Preferably, a chain transfer agent which is soluble in the monomer component such as alkyl mercaptans, for example, tertiary-dodecyl mercaptan, 2-mercaptoethanol, isooctyl mercaptopropionate, n-octyl mercaptan or 3-mercapto acetic acid is preferably incorporated into the polymer charge. Other chain transfer agents such as ketones, for example, methyl ethyl ketone, chlorocarbons such as chloroform can be used. Chain transfer agents provide the necessary control over molecular weight to give products having the required viscosity for electrodeposition. Tertiary-dodecyl mercaptan is preferred. If used, the amount of chain transfer agent should be about 1 to 6 percent by weight based on weight of polymerizable monomer composition.

Preferred products are obtained from using about 2.5 to 50, preferably 5 to 25 percent by weight of the quaternary ammonium base group-containing polymer and from about 50 to 97.5, preferably 95 to 75 percent by weight of the polymerizable monomer component; the percentage by weight being based on total weight of the dispersant and the dispersed phase.

For polymerization of the dispersed phase in the presence of the dispersant, the aqueous medium preferably should be present in amounts of about 50 to 90, preferably about 55 to 75 percent by weight based on total weight of the dispersant and the aqueous medium.

Besides water, the aqueous medium can contain some organic cosolvents. The organic cosolvents are preferably at least partially soluble with water. Examples of such solvents include oxygenated organic solvents such as monoalkyl ethers of ethylene glycol and diethylene glycol which contain from 1 to 4 carbon atoms in the alkyl group such as the monoethyl and monobutyl ethers of ethylene glycol and diethylene glycol. Examples of other water-soluble solvents include alcohols such as ethanol, isopropanol, butanol and diacetone alcohol. If used, the organic cosolvents are used in amounts less than 10 and preferably less than 5 percent by weight based on total weight of the aqueous medium.

Polymeric products can be prepared in accordance with the present invention to form stable aqueous dispersions. By stable is meant the dispersions will not gel, flocculate nor precipitate at a temperature of 25° C. for at least 60 days. If some precipitation does occur, the precipitate can be easily redispersed by low shear agitation. The aqueous dispersions are usually two-phase, translucent, aqueous polymer systems in which the aqueous phase forms the continuous phase.

As indicated above, the polymeric products of the present invention contain active hydrogens such as hydroxyl and amino which make them reactive at elevated temperatures with a curing agent. The curing agent which is used should be one which is stable in the dispersion of the polymeric product at room temperature but reactive with the active hydrogens at elevated temperature, that is, from about 90° to 260° C., to form a crosslinked product. Examples of suitable curing agents are capped or blocked isocyanates, aminoplast resins and phenolic resins such as phenol-formaldehyde condensates including allyl ether derivatives thereof.

Examples of capped isocyanates are those described in U.S. Pat. No. 4,104,147, column 7, line 36, continuing to column 8, line 37, the portions of which are hereby incorporated by reference.

Sufficient capped isocyanate is present such that the equivalent ratio of latent isocyanate groups to active hydrogens of the polymer is at least 0.1:1, preferably about 0.3 to 1:1.

Examples of aminoplast resins are those described in U.S. Pat. No. 3,937,679 to Bosso and Wismer in column 16, line 3, continuing to column 17, line 47, the portions of which are hereby incorporated by reference. Also disclosed in the aforementioned portions of the 3,937,679 patent, the aminoplast can be used in combination with the methylol phenol ethers. Aminoplast curing agents usually constitute from about 1 to 60, preferably 5 to 40 percent by weight of the resinous composition based on total weight of aminoplast and the polymeric product.

The resin solids content of the aqueous dispersion depends upon the particular end use of the dispersion and is in general not critical. Aqueous dispersions containing at least 1 and usually from about 5 to 40 percent by weight resin solids are typical. For electrodeposition use, resin solids contents of about 5 to 20 percent are usually used.

Aqueous dispersions of the polymeric products of the present invention can be used in coating applications. The coating composition can be used to form clear coatings or optionally can be pigmented. The pigments may be any of the conventional type comprising, for example, iron oxides, lead oxides, strontium chromate, carbon black, coal, coal dust, titanium dioxide, talc, barium sulfate, as well as color pigments such as cadmium yellow, cadmium red, chromium yellow, phthalocyanine blue and the metallic pigments such as aluminum flake. The pigment content of the dispersion is usually expressed as the pigment-to-resin ratio. Pigment-to-resin ratio within the range of 0.02 to 1:1 is typical.

In addition to pigment, various additives such as fillers, plasticizers, anti-oxidants, ultraviolet light absorbers, defoamers, fungicides, flow control agents, surfactants and other formulating additives can optionally be employed if desired. These materials will generally constitute up to 20 percent by weight of the aqueous dispersion based on total solids.

When the aqueous dispersions are employed for electrodeposition use, the aqueous dispersion is placed in contact with an electrically conductive anode and an electrically conductive cathode with the surface to be coated being the cathode. Following contact with the aqueous dispersion, an adherent film of the coating composition is deposited on the cathode when a sufficient voltage is impressed between the electrodes. The applied voltage can be varied and can be, for example, as low as one volt to as high as several thousand volts, but typically between 50 and 500 volts. Current density is usually between 1.0 ampere and 15 amperes per square foot and tends to decrease during electrodeposition indicating the formation of an insulating film.

The aqueous dispersions of the polymeric products of the present invention can also be used in other conventional coating applications such as flow, dip, spray and roll coating applications. For electrodeposition and other conventional coating applications, the coating composition can be applied to a variety of electroconductive substrates especially metal such as steel, aluminum, copper, magnesium and the like, but also including metallized plastic and conductive carbon-coated materials. For other conventional coating applications, the compositions can be applied to non-metallic substrates such as glass, wood and plastic.

After a coating has been applied by electrocoating or other conventional coating applications, it is cured usually by baking at elevated temperatures such as 90° to 260° C. for about 1 to 30 minutes. The cured coating will generally have a thickness of about 0.1 to 10, usually 0.5 to 5 mils, depending upon the solids content of the coating composition and the method of applying the coating.

Illustrating the invention are the following examples, which, however, are not to be considered as limiting the invention to their details. All quantities are on a weight basis unless otherwise indicated.

EXAMPLE I

A cationic polymeric product suitable for use in electrodeposition was prepared by polymerizing under free radical polymerization conditions a mixture of styrene and butadiene in aqueous medium in the presence of a quaternary ammonium base group-containing polymer which is formed from quaternizing a polyglycidyl ether of a polyphenol with the lactate salt of dimethylaminoethyl methacrylate. Also included in the epoxy-amine adduct backbone were capped isocyanate groups which were formed by reacting the 2-ethylhexyl monourethane of 2,4-toluene diisocyanate with the hydroxyl groups present in the polyglycidyl ether.

The lactic acid salt of dimethylaminoethyl methacrylate was prepared from the following charge:

| Ingredients | Parts by Weight (in grams) | Solids | Equivalents |
|---|---|---|---|
| dimethylaminoethyl methacrylate | 1256.0 | 1256.0 | 8.0 |
| lactic acid | 960.0 | 720.0 | 8.0 |
| deionized water | 254.0 | | |

The dimethylaminoethyl methacrylate was charged to a reaction vessel under a nitrogen blanket. The lactic acid addition was initiated at a temperature of 25° C. and addition was continued over the period of about 20 minutes with the temperature of the reaction mixture reaching as high as 63° C. upon which it was cooled with an ice bath to 56° C. The reaction mixture was then thinned with the deionized water to form the lactic acid salt.

The quaternary ammonium salt group-containing polymer was prepared from the following charge:

| Ingredients | Parts by Weight (in grams) | Solids | Equivalents |
|---|---|---|---|
| EPON 1001[1] | 686.4 | 686.4 | 1.3 epoxy; 2.0 hydroxyl |
| xylene | 36.1 | | |
| 2-ethylhexyl monourethane of 2,4-toluene diisocyanate | 320.0 | 304.0 | 1.0 NCO |
| lactic acid salt of dimethylaminoethyl methacrylate | 385.9 | 308.7 | 1.24 amine |
| deionized water | 2905.0 | | |

[1]Polyglycidyl ether of polyphenol having an epoxy equivalent weight of 528 commercially available from Shell Chemical Company.

The EPON 1001 and xylene were charged to a reaction vessel and heated to 190° C. to remove any water by using a Dean-Stark trap. The reaction mixture was then cooled to 120°–125° C. and the 2-ethylhexyl monourethane of 2,4-toluene diisocyanate added and the reaction mixture held at a temperature of about 120°–125° C. for about 1½ hours. The reaction mixture was then cooled to 90°–95° C. and the lactic acid salt of dimethylaminoethyl methacrylate and 96.0 grams of deionized water added. The reaction mixture was held for one hour at 85°–95° C. then cooled to room temperature and thinned with 2187.5 grams of deionized water to form a 35 percent resin solids aqueous dispersion. The reaction mixture was then thinned with an additional 621.5 parts by weight of deionized water to form a 30 percent resin solids aqueous dispersion.

Styrene and butadiene were polymerized in the presence of a free radical catalyst in this aqueous dispersion in the following charge ratio:

| Ingredients | Parts by Weight (in grams) |
|---|---|
| quaternary ammonium salt group-containing polymer prepared as described above | 33.7 |
| deionized water | 433.5 |
| VAZO 64[1] | 7.7 |
| tertiary-dodecyl mercaptan | 7.7 |
| styrene | 57.7 |
| 1,3-butadiene | 134.7 |

[1]Azobisisobutyronitrile commercially available from E. I. duPont de Nemours and Company.

The ingredients were charged to a reaction vessel capable of maintaining pressure. The reaction vessel was sealed and heated to 100° C. and held at this temperature with agitation to complete the polymerization. The resulting polymeric product was a viscous, smooth dispersion having a solids content of 30.6 percent.

The polymeric product was thinned with additional deionized water to form about a 10 percent solids electrodeposition bath.

Zinc phosphated steel panels were cathodically electrodeposited in this bath at 350 volts for 90 seconds at a bath temperature of 23° C. The films were cured at a temperature of 400° F. (204° C.) for 20 minutes to yield very glossy films having a thickness of about 0.7 to 0.85 mil with some craters.

EXAMPLE II

The following examples shows the preparation of a cationic polymeric product suitable for use in electrodeposition and which is formed by polymerizing styrene and butadiene in the presence of a quaternary ammonium base group-containing polymer which is formed from reacting EPON 1001 with diamylamine and the lactic acid salt of dimethylaminoethyl methacrylate.

The lactic acid salt of dimethylaminoethyl methacrylate was prepared from the following charge and in accordance with the procedure generally described in Example I:

| Ingredients | Parts by Weight (in grams) | Solids | Equivalents |
|---|---|---|---|
| dimethylaminoethyl methacrylate | 1180.0 | 1294.6 | 8.52 |
| aqueous lactic acid | 990.2 | 742.6 | 8.25 |
| deionized water | 257.0 | | |

A quaternary ammonium salt group-containing polymer was prepared from the following charge:

| Ingredients | Parts by Weight (in grams) | Solids | Equivalents |
|---|---|---|---|
| EPON 1001 | 858.0 | 858.0 | 1.72 |
| xylene | 45.1 | | |
| lactic acid salt of dimethylaminoethyl methacrylate | 300.5 | 240.8 | 0.60 |
| deionized water | 2101.6 | | |
| diamylamine | 89.3 | 89.3 | 0.35 |

The procedure for preparing the quaternary ammonium salt group-containing polymer was as generally described in Example I, that is, the EPON 1001 and xylene were charged to a reaction vessel and heated to 160° C. and any water was removed with a Dean-Stark trap. The reaction mixture was then cooled to 92° C. and the lactic acid salt of dimethylaminoethyl methacrylate and 98.5 grams of deionized water was added with the temperature being maintained at about 83°–95° C. The reaction mixture was then cooled to about 85° C. followed by the addition of the diamylamine and then thinned with 2003.1 grams of deionized water to form a 35 percent resin solids aqueous dispersion.

Styrene and butadiene were polymerized in the presence of a free radical catalyst in this aqueous dispersion in the following charge ratio:

| Ingredients | Parts by Weight (in grams) |
|---|---|
| quaternary ammonium salt group- | |

-continued

| Ingredients | Parts by Weight (in grams) |
|---|---|
| containing resin prepared as described above | 1551.7 |
| deionized water | 11418.3 |
| VAZO 64 | 85.0 |
| tertiary-dodecyl mercaptan | 85.0 |
| styrene | 1458.0 |
| 1,3-butadiene | 3402.0 |

The reaction conditions were as generally described in Example I. The polymeric product had a solids content of 28.5 percent.

The polymer prepared as described above was thinned with deionized water to form a 20 percent solids electrodeposition bath. The dispersion had a pH of 5.6 and a conductivity of 750 micromhos and a General Motors throwpower of 11¼ inches measured at 500 volts for 120 seconds at a bath temperature of 80° F. (27° C.). The film build was about 0.6 to 0.8 mil. The aqueous dispersion had a rupture voltage of 550 volts. Zinc phosphated steel panels were electrodeposited in the bath at 350 volts for 90 seconds at room temperature and baked at 400° F. (204° C.) for 20 minutes. The film was rough. Thirty (30) parts by weight of 2-ethylhexanol was then stirred into the bath and the zinc phosphated steel panels electrodeposited and baked under the same conditions. This time, smooth, glossy films resulted.

EXAMPLE III

A cationic polymeric product was prepared by polymerizing a mixture of styrene and butadiene in the presence of a quaternary ammonium base group-containing polymer which was formed by reacting a polyglycidyl ether of a polyphenol with a polyester diol (polycaprolactone diol having a molecular weight of about 540) and the lactic acid salt of dimethylaminoethyl methacrylate.

A quaternary ammonium salt group-containing polymer was prepared from the following charge:

| Ingredients | Parts by Weight (in grams) | Solids |
|---|---|---|
| EPON 829[1] | 608.0 | 583.4 |
| Bisphenol A | 196.25 | 196.3 |
| PCP-0200[2] | 159.5 | 159.5 |
| benzyldimethylamine | 2.0 | 2.0 |
| 75% by weight aqueous lactic acid | 2.75 | 2.0 |
| xylene | 24.3 | |
| 2-butoxy ethanol | 55.1 | |
| lactic acid salt of dimethyl-aminoethyl methacrylate of Example II | 199.9 | 159.9 |
| deionized water | 4267.5 | |

[1]Polyglycidyl ether of polyphenol having an epoxy equivalent weight of about 193 to 197 commercially available from Shell Chemical Company.
[2]Polycaprolactone diol having a molecular weight of about 540 commercially available from Union Carbide Corporation.

The EPON 829 and Bisphenol A were charged to a reaction vessel and heated to 155° C. under a nitrogen blanket to initiate an exotherm. The exotherm was maintained for about one hour and the polycaprolactone diol was added. The benzyldimethylamine (catalyst) was added and the reaction maintained at a temperature of 130°–140° C. until the reaction mixture had a Gardner-Holdt viscosity of W+ measured as a 50 percent solids solution in 2-ethoxyethanol. The benzyldimethylamine catalyst was then neutralized with the lactic acid and the reaction mixture thinned with the xylene and the 2-butoxyethanol. At a reaction temperature of about 94° C., the lactic acid salt of the dimethylaminoethyl methacrylate and 81.5 grams of deionized water were added to the reaction mixture and the reaction mixture held at a temperature of about 90° C. for about ½ hour. The reaction mixture was then thinned with 4186.0 grams of the deionized water to form about a 20 percent solids dispersion.

A mixture of styrene and butadiene (30 percent styrene and 70 percent butadiene) was polymerized in the presence of this quaternary ammonium salt polymer in the following charge ratio:

| Ingredients | Parts by Weight (in grams) |
|---|---|
| quanternary ammonium salt group-containing polymer | 125.5 |
| deionized water | 356.2 |
| VAZO 64 | 5.5 |
| tertiary-dodecyl mercaptan | 5.5 |
| styrene | 54.7 |
| 1,3-butadiene | 127.6 |

The reaction conditions were as generally described in Example I.

Two hundred and sixty-five (265) parts of the polymer prepared as described above (filtrate 79.5 parts solids) was combined with 4 parts of N-butoxymethyl acrylamide and 576 parts deionized water to form a 10 percent solids electrodeposition bath. The addition of the N-butoxymethyl acrylamide resulted in considerable coagulum formation which was filtered out. Zinc phosphated steel panels were electrodeposited in this bath at 350 volts for 90 seconds at room temperature and then baked at 400° F. (204° C.) for 20 minutes. The films had some pattern but were also glossy and had a thickness of about 1 mil. When the panels were scribed and exposed to a salt spray fog in accordance with ASTM D-117 for two weeks, no scribe creepage was evidenced on the films.

EXAMPLE IV

The following example shows the preparation of a cationic polymeric product which was formed from polymerizing 1,3-butadiene, styrene and N-butoxymethyl acrylamide (70/25/5 weight ratio) in the presence of a quaternary ammonium salt group-containing polymer which is formed from reacting a polyglycidyl ether of a polyphenol with the lactic acid salt of dimethylaminoethyl methacrylate.

A quaternary ammonium salt group-containing polymer was prepared from reacting the following ingredients:

| Ingredients | Parts by Weight (in grams) | Solids | Equivalents |
|---|---|---|---|
| EPON 1004[1] | 696.0 | 696.0 | 0.75 epoxy |
| xylene | 77.3 | | |
| lactic acid salt of dimethyl-aminoethyl methacrylate of Example I | 231.6 | 185.3 | 0.75 |
| deionized water | 2520.2 | | |

[1]Polyglycidyl ether of bisphenol A having an epoxy equivalent weight of 928 commercially available from Shell Chemical Company.

The quaternary ammonium salt group-containing polymer was prepared as generally described in Example I. The resulting reaction mixture had a solids content of 25 percent and contained 0.150 milliequivalents of quaternary ammonium base group per gram of resin sample and 0.208 milliequivalents of total base per gram of sample.

A mixture of styrene, butadiene and N-butoxymethyl acrylamide was polymerized in the presence of a free radical catalyst with the aqueous dispersion prepared as described above in the following charge ratio:

| Ingredients | Parts by Weight (in grams) |
| --- | --- |
| quaternary ammonium salt group-containing resin (25% resin solids prepared as described above) | 81.0 |
| deionized water | 401.0 |
| VAZO 64 | 5.5 |
| tertiary-dodecyl mercaptan | 5.5 |
| N-butoxymethyl acrylamide (61.5% solids)[1] | 14.9 |
| styrene | 45.6 |
| butadiene | 127.6 |

[1]61.5 percent solids solution of N-(butoxymethyl) acrylamide in a 1:3 solvent mixture of xylene and n-butanol.

The polymerization was conducted as generally described in Example I to yield a viscous, polymeric product having a solids content of 29.8 percent.

The polymeric product was thinned with deionized water to form a 10 percent resin solids electrodeposition bath. Zinc phosphated steel panels were electrodeposited in this bath at 400 volts for 90 seconds at room temperature and the coatings baked at 400° F. (204° C.) for 20 minutes to form films having a thickness of 0.25-0.30 mil on the zinc phosphated steel. When the panels were scribed and exposed to a salt spray fog in accordance with ASTM D-117, no scribe creepage after two weeks salt spray exposure was evidenced.

I claim:

1. A stable, aqueous dispersion of a cationic polymeric product prepared by polymerizing in aqueous medium under free radical initiated addition polymerization conditions:
   (A) an aqueous dispersed phase of a polymerizable, ethylenically unsaturated monomer composition, in the presence of
   (B) a quaternary ammonium base group-containing polymer which is formed from reacting a polyepoxide with an unsaturated tertiary amine in the presence of a proton source.

2. The dispersion of claim 1 in which the monomer composition (A) includes a diene monomer.

3. The dispersion of claim 2 in which the diene is 1,3-butadiene.

4. The product of claim 1 in which the monomer composition (A) includes an alkyl ester of acrylic or methacrylic acid containing from 1 to 8 carbon atoms in the alkyl group.

5. The dispersion of claim 1 in which the monomer composition (A) includes styrene.

6. The dispersion of claim 1 in which the unsaturated tertiary amine of (B) has the following structure:

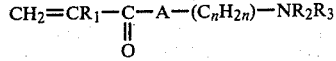

wherein $R_1$ is hydrogen or methyl, $R_2$ and $R_3$ are the same or different and are alkyl containing from 1 to 4 carbon atoms, n is one of the integers 1 to 6, and A is oxygen or $NR_4$ where $R_4$ is hydrogen or alkyl having 1 to 4 carbon atoms.

7. The dispersion of claim 6 in which the unsaturated tertiary amine of (B), A is oxygen, n is 2 or 3 and $R_2$ and $R_3$ are the same or different and are alkyl containing from 1 to 2 carbon atoms.

8. The dispersion of claim 1 in which the polyepoxide is polyglycidyl ether of a cyclic polyol.

9. The dispersion of claim 8 in which the cyclic polyol is a polyphenol.

10. The dispersion of claim 1 in which the polyepoxide-amine adduct has an average molecular weight of from about 500 to 5000.

11. The dispersion of claim 1 in which the polymerization is carried out in the presence of a free radical polymerization catalyst.

12. The dispersion of claim 1 in which the polymerization is carried out in the presence of a chain transfer agent.

13. The dispersion of claim 12 in which the chain transfer agent is tertiary-dodecyl mercaptan.

14. The dispersion of claim 1 which contains from about 50 to 97.5 percent by weight of (A) and from about 50 to 2.5 percent by weight of (B), the percentage by weight being based on total weight of (A) and (B).

15. A coating composition comprising an aqueous dispersion of the polymeric products of any of claims 1-14.

16. A method of electrocoating an electrically conductive surface serving as a cathode in an electrical circuit comprising said cathode, an anode and an aqueous electrodepositable composition which comprises passing an electric current between said cathode and anode and wherein the electrodepositable composition comprises an aqueous dispersion of the polymeric product of any of claims 1-14.

17. A method for preparing a polymeric product dispersed in aqueous medium comprising:
   (A) dispersing a polymerizable ethylenically unsaturated monomer composition in aqueous medium and in the presence of a quaternary ammonium base group-containing polymer which is formed from reacting a polyepoxide with an unsaturated tertiary amine in the presence of a proton source;
   (B) subjecting the dispersion of (A) to free radical initiated addition polymerization conditions so as to form a stable aqueous dispersion of a cationic polymeric product.

18. The method of claim 17 in which the monomer composition (A) includes a diene monomer.

19. The method of claim 18 in which the diene is 1,3-butadiene.

20. The method of claim 17 in which the monomer composition (A) includes an alkyl ester of acrylic or methacrylic acid containing from 1 to 8 carbon atoms in the alkyl group.

21. The method of claim 17 in which the monomer composition (A) includes styrene.

22. The method of claim 17 in which the unsaturated tertiary amine of (B) has the following structure:

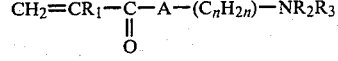

wherein $R_1$ is hydrogen or methyl, $R_2$ and $R_3$ are the same or different and are alkyl containing from 1 to 4 carbon atoms, n is one of the integers 1 to 6, and A is oxygen or $NR_4$ where $R_4$ is hydrogen or alkyl having 1 to 4 carbon atoms.

23. The method of claim 22 in which the unsaturated tertiary amine of (B), A is oxygen, n is 2 or 3 and $R_2$ and $R_3$ are the same or different and are alkyl containing from 1 to 2 carbon atoms.

24. The method of claim 17 in which the polyepoxide is polyglycidyl ether of a cyclic polyol.

25. The method of claim 24 in which the cyclic polyol is a polyphenol.

26. The method of claim 17 in which the polyepoxide-amine adduct has an average molecular weight of from about 500 to 5000.

27. The method of claim 17 in which the polymerization is carried out in the presence of a free radical polymerization catalyst.

28. The method of claim 17 in which the polymerization is carried out in the presence of a chain transfer agent.

29. The method of claim 28 in which the chain transfer agent is tertiary-dodecyl mercaptan.

30. The method of claim 17 which contains from about 50 to 97.5 percent by weight of (A) and from about 50 to 2.5 percent by weight of (B), the percentage by weight being based on total weight of (A) and (B).

31. The method of claim 17 in which the free radical initiated addition polymerization conditions are by heating in the presence of a free radical initiator.

32. The method of claim 31 in which the heating is conducted for about 2 to 20 hours at about 75° to 100° C.

* * * * *